United States Patent
Ma et al.

(10) Patent No.: US 8,107,740 B2
(45) Date of Patent: Jan. 31, 2012

(54) APPARATUS AND METHOD FOR EFFICIENT INDEXING AND QUERYING OF IMAGES IN SECURITY SYSTEMS AND OTHER SYSTEMS

(75) Inventors: Yunqian Ma, Roseville, MN (US); Isaac Cohen, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 805 days.

(21) Appl. No.: 12/192,747

(22) Filed: Aug. 15, 2008

(65) Prior Publication Data

US 2010/0040296 A1    Feb. 18, 2010

(51) Int. Cl.
*G06K 9/62* (2006.01)
(52) U.S. Cl. .......................... 382/225; 382/305
(58) Field of Classification Search .................. 382/217, 382/224, 225, 305, 306; 707/711, 715, 741, 707/744, E17.002, E17.004, E17.019, E17.02
See application file for complete search history.

(56) References Cited

U.S. PATENT DOCUMENTS

| | | | | |
|---|---|---|---|---|
| 2006/0053342 A1 | 3/2006 | Bazakos et al. | ................. | 714/37 |
| 2006/0102843 A1 | 5/2006 | Bazakos et al. | .......... | 250/339.05 |
| 2006/0187884 A1 | 8/2006 | Ma et al. | ....................... | 370/332 |
| 2006/0233436 A1 | 10/2006 | Ma et al. | ........................ | 382/154 |
| 2006/0233461 A1 | 10/2006 | Ma et al. | ........................ | 382/285 |
| 2006/0285723 A1 | 12/2006 | Morellas et al. | ............... | 382/103 |
| 2007/0097873 A1 | 5/2007 | Ma et al. | ........................ | 370/252 |
| 2007/0121999 A1 | 5/2007 | Ma et al. | ........................ | 382/103 |
| 2007/0122040 A1 | 5/2007 | Au et al. | ........................ | 382/224 |
| 2007/0177792 A1 | 8/2007 | Ma et al. | ........................ | 382/155 |
| 2007/0177819 A1 | 8/2007 | Ma et al. | ........................ | 382/284 |
| 2007/0268145 A1 | 11/2007 | Bazakos et al. | ............. | 340/573.1 |
| 2008/0002856 A1 | 1/2008 | Ma et al. | ........................ | 382/103 |
| 2008/0031491 A1 | 2/2008 | Ma et al. | ........................ | 382/103 |
| 2008/0112699 A1 | 5/2008 | Huseth et al. | .................... | 396/89 |
| 2008/0123900 A1 | 5/2008 | Ma et al. | ........................ | 382/103 |

OTHER PUBLICATIONS

John Wright, et al., "Robust Face Recognition via Sparse Representation", Manuscript Accepted by IEEE Trans. PAMI, Mar. 2008, pp. 1-21.

*Primary Examiner* — Andrew W Johns (57) ABSTRACT

A method includes receiving one or more query images and identifying multiple features associated with an object or an activity using the one or more query images. The method also includes accessing a sparse representation index using the identified features. The sparse representation index includes a multi-dimensional polytope having multiple vertices, and the features identify a point in the polytope. The method further includes identifying multiple vertices in the sparse representation index that are associated with the identified point and providing one or more images associated with the identified vertices. In addition, the method includes identifying one or more clusters of features associated with the identified vertices and providing one or more additional images associated with the one or more identified clusters. The one or more clusters may be identified using a clustering index identifying the clusters and features of training images associated with the clusters.

20 Claims, 3 Drawing Sheets

| CLUSTER | FEATURE | | | | | | | |
|---|---|---|---|---|---|---|---|---|
| CLUSTER 1 | A1 | A7 | A11 | A12 | A15 | | | |
| CLUSTER 2 | A2 | A3 | A4 | A8 | | | | |
| CLUSTER 3 | A5 | A6 | A9 | A10 | A13 | A14 | A17 | A18 | A22 |
| CLUSTER 4 | A16 | A19 | A20 | A23 | | | | |
| CLUSTER 5 | A21 | A24 | | | | | | |

APPARATUS AND METHOD FOR EFFICIENT INDEXING AND QUERYING OF IMAGES IN SECURITY SYSTEMS AND OTHER SYSTEMS

TECHNICAL FIELD

This disclosure relates generally to image processing systems and more specifically to an apparatus and method for efficient indexing and querying of images in security systems and other systems.

BACKGROUND

Video surveillance cameras are used extensively in airports, rails stations, casinos, and other secure or monitored areas. Often times, a human operator is required to view and track video streams from multiple video cameras. For example, the operator may monitor several video streams, often cycling through a number of video streams and spending more time viewing video streams of more important areas being monitored.

In crowded environments with numerous cameras, an operator is often unable to aggregate information collected by a large number of video cameras to assess threats associated with suspicious behaviors. Also, due to the large number of video cameras deployed, the operator is often unable to track a suspicious person or other object across a large facility or other area. In addition, when a forensics analysis is conducted, tracking the whereabouts of a suspicious person or other object typically requires the operator to sift through a large number of video streams.

In order to perform fast searches of images, some systems generate a tree-based data structure, where similar images or similar objects and activities are grouped together under the same node of a tree. However, this type of approach is typically not effective when the appearances of different objects and activities are difficult to differentiate. In these circumstances, it is difficult for the systems to properly select the appropriate node in the tree for a given object or activity.

SUMMARY

This disclosure provides an apparatus and method for efficient indexing and querying of images in security systems and other systems.

In a first embodiment, a method includes receiving one or more query images and identifying multiple features associated with an object or an activity using the one or more query images. The method also includes accessing a sparse representation index using the identified features. The sparse representation index includes a multi-dimensional polytope having multiple vertices, and the features identify a point in the polytope. The method further includes identifying multiple vertices in the sparse representation index that are associated with the identified point and providing one or more images associated with the identified vertices. In addition, the method includes identifying one or more clusters of features associated with the identified vertices and providing one or more additional images associated with the one or more identified clusters.

In particular embodiments, the vertices of the multi-dimensional polytope are associated with features of training images. Also, the identified features represent a combination of the features associated with the identified vertices.

In other particular embodiments, the vertices of the polytope define multiple areas. Also, identifying the multiple vertices in the sparse representation index includes identifying the vertices defining the area in which the point resides.

In yet other particular embodiments, identifying the one or more clusters includes using a clustering index identifying the clusters and features of training images associated with the clusters.

In still other particular embodiments, providing the one or more images includes presenting the one or more images to an operator. Also, providing the one or more additional images includes providing the one or more additional images in response to a request for more images from the operator.

In other particular embodiments, the method further includes generating the sparse representation index and generating a clustering index associated with multiple clusters of features. Generating the sparse representation index could include identifying multiple features associated with multiple objects or multiple activities using training samples and performing an $L^1$-norm minimization of $y=Ax_0$. Here, $x_0 = [0, \ldots, 0, \alpha_{i,1}, \alpha_{i,2}, \ldots, \alpha_{i,n}, 0, \ldots, 0]^T$ and denotes a coefficient vector, $\alpha_{i,1}$ through $\alpha_{i,n}$ denote non-zero entries in the coefficient vector associated with an $i^{th}$ class of training samples, and A represents a concatenation of all training samples from all classes. Generating the clustering index could include forming an initial set of clusters (where each contains at least one image) and iteratively merging two closest clusters defined using average linkage until a specified number of clusters is obtained.

In a second embodiment, an apparatus includes at least one memory configured to store images. Also, the apparatus includes at least one processor configured to identify multiple features associated with multiple objects or multiple activities using the images, generate sparse data representations of the identified features, and generate a sparse representation index using the sparse data representations. The sparse representation index includes a multi-dimensional polytope having multiple vertices, where the vertices are associated with the sparse data representations.

In a third embodiment, a computer readable medium embodies a computer program. The computer program includes computer readable program code for identifying multiple features associated with an activity using one or more query images. The computer program also includes computer readable program code for accessing a sparse representation index using the identified features. The sparse representation index includes a multi-dimensional polytope having multiple vertices, where the features identify a point in the polytope. The computer program further includes computer readable program code for identifying multiple vertices in the sparse representation index that are associated with the identified point. In addition, the computer program includes computer readable program code for providing one or more images associated with the identified vertices.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
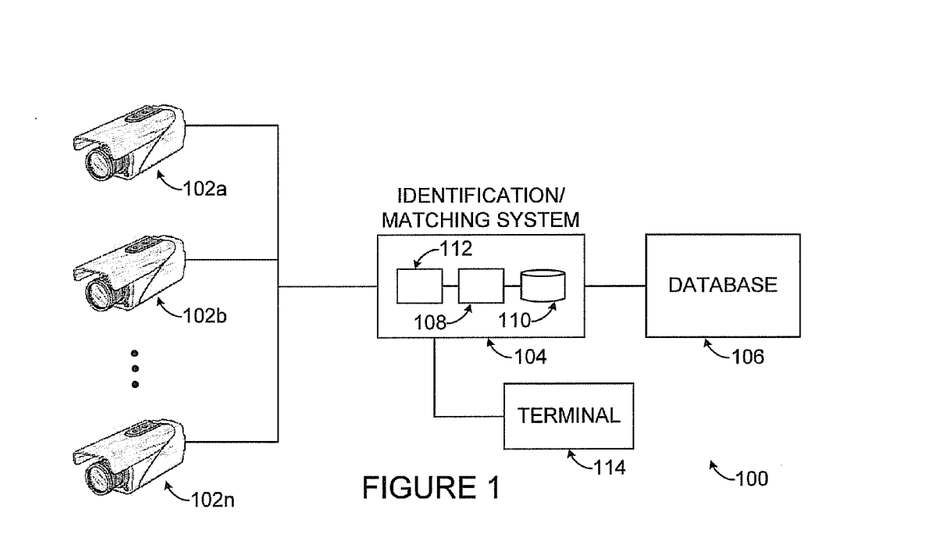
FIG. 1 illustrates an example system for efficient indexing and querying of images according to this disclosure.

FIG. 1 illustrates an example system 100 for efficient indexing and querying of images according to this disclosure. The embodiment of the system 100 shown in FIG. 1 is for illustration only. Other embodiments of the system 100 could be used without departing from the scope of this disclosure.

As shown in FIG. 1, the system 100 includes cameras 102a-102n. Each of the cameras 102a-102n captures images, such as images of people or other objects, in a specified area. The cameras 102a-102n could be distributed throughout one or more areas being monitored and positioned in any suitable positions within the area(s). Each of the cameras 102a-102n includes any suitable structure for capturing video and/or still images. Each of the cameras 102a-102n could, for instance, represent a low-cost video camera. Each of the cameras 102a-102n could also include at least one interface for communicating over a wired or wireless network in order to provide the captured images.

In this example, images from the cameras 102a-102n are provided to an identification/matching system 104, which analyzes the images. For example, the identification/matching system 104 could identify an object or activity in one or more of the images. The identification/matching system 104 could also access a first index associated with objects or activities and identify other images associated with the same or similar objects or activities. As a particular example, the identification/matching system 104 could identify a person in an image received from one or more of the cameras 102a-102n. The identification/matching system 104 could then access the first index and identify a first set of images that contain the same person or a person similar in appearance. Further, the identification/matching system 104 could access a second index and identify a second set of images (one or more clusters) associated with the images in the first set. In this way, the identification/matching system 104 can support the efficient querying of the indexes in order to locate images related to objects or activities captured by the cameras 102a-102n. In addition, the identification/matching system 104 can be used to generate the indexes, such as by using training data or other data provided to the identification/matching system 104.

The identification/matching system 104 includes any hardware, software, firmware, or combination thereof for indexing and/or querying images. The identification/matching system 104 could, for example, represent a computing device, such as a desktop, laptop, or server computer. As a particular example, the identification/matching system 104 could include at least one processor 108 and at least one memory 110 storing instructions and data used, generated, or collected by the processor(s) 108. The identification/matching system 104 could also include one or more network interfaces 112 for receiving data from the cameras 102a-102n or other devices. The one or more network interfaces 112 could, for instance, include a wired Ethernet interface or a wireless transceiver. Additional details regarding the identification/matching system 104 are provided below.

A database 106 is coupled to the identification/matching system 104. The database 106 stores data used, generated, or collected by the identification/matching system 104. For example, the database 106 could store multiple indexes generated or used by the identification/matching system 104. The database 106 includes any suitable structure for storing and facilitating retrieval of information. Although shown as being coupled directly to the identification/matching system 104, the database 106 could reside in any location or locations that are accessible to the identification/matching system 104.

In FIG. 1, at least one terminal 114 is coupled to the identification/matching system 104 (either directly or indirectly, such as via a wired or wireless network). The terminal 114 allows interaction with the identification/matching system 104. For example, the terminal 114 could allow an operator to provide training images to the identification/matching system 104, which the system 104 can use to generate indexes. The terminal 114 could also allow an operator to request particular data from the identification/matching system 104, such as when the operator requests images associated with a person or other object captured by the cameras 102a-102n. The terminal 114 could be used to facilitate any other interactions with the identification/matching system 104. The terminal 114 includes any suitable wired or wireless device for communicating with the identification/matching system 104.

As described in more detail below, the identification/matching system 104 combines a sparse data representation of objects or activities and a clustering data structure for images. The sparse data representation of an object or activity (sometimes called a "minimal representation") represents a sparse linear representation with respect to an over-complete dictionary of training images. A sparse data representation could be the minimal representation of an object or activity. The first index described above can be formed from multiple sparse data representations to form a multi-dimensional polytope. A query can be performed to select a point within the multi-dimensional polytope, and multiple sparse data representations associated with the point (the vertices of the polytope around that point) could be selected. A first set of images, such as an image for each of the sparse data representations, can be retrieved and provided to an operator.

The clustering data structure can be used as the second index described above to associate related images, such as images showing the same or similar person or other object or images showing the same or similar activity. Each image contained in the first set of images may belong to one or more clusters. For example, if a query into the first index returns six sparse data representations, these six sparse data representations may be associated with six images, and those six images could be associated with one or more clusters. If requested by an operator or at other times, the images in those clusters can be retrieved and provided to the operator.

Figure 3:
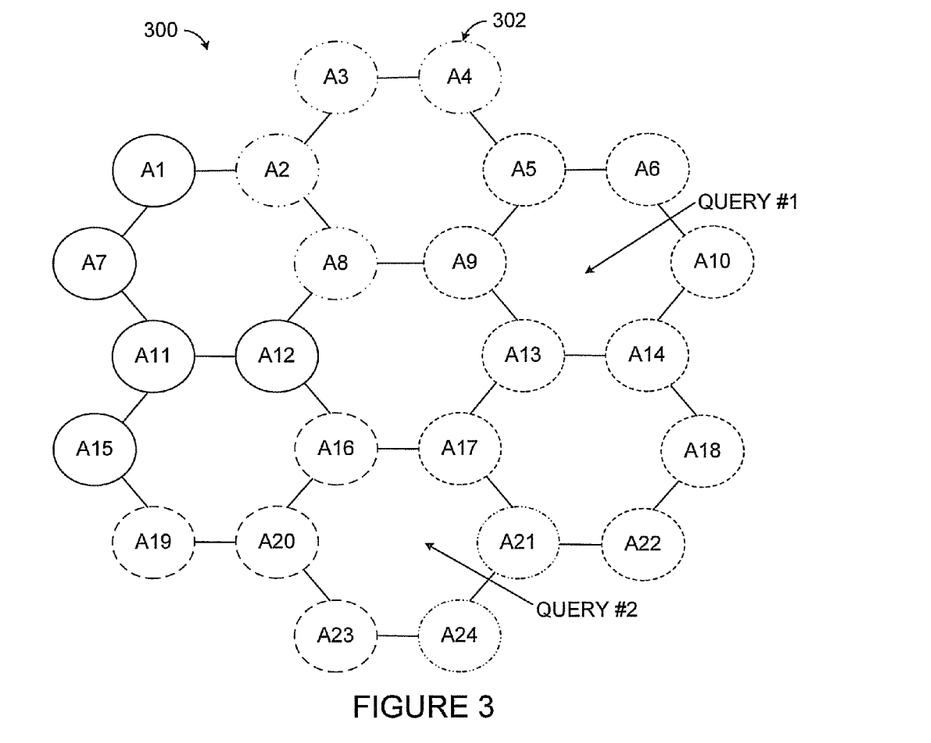
FIG. 3 illustrates an example sparse data representation index according to this disclosure.
Figure 4:
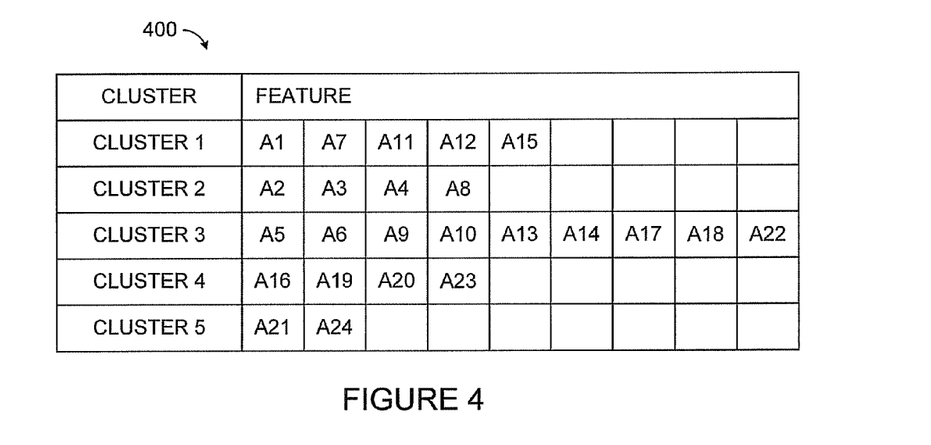
FIG. 4 illustrates an example clustering index according to this disclosure.

In this way, the sparse data representations can be used to quickly locate one or multiple images associated with a query, and the clustering can be used to locate additional images associated with the query. Additional details regarding the sparse data representations and the clustering are shown in FIGS. 3 and 4, which are described below.

Moreover, many of the monitoring functions normally performed by operators can be automated in the system 100. For example, the identification/matching system 104 could automatically scan images from the cameras 102a-102n to identify whether people captured in the images are on "watch lists." As a particular example, the identification/matching system 104 could determine when an image of a person from a camera is related to images of known or suspected terrorists or criminals. The identification/matching system 104 could also automatically detect suspicious activities captured by the cameras 102a-102n.

Although FIG. 1 illustrates one example of a system 100 for efficient indexing and querying of images, various changes may be made to FIG. 1. For example, the system 100 could include any number of cameras, identification/matching systems, databases, and terminals. Also, while the identification/matching system 104 in FIG. 1 is described as performing both the generation of the indexes and the use of those indexes, these functions could be performed by different devices or systems. In addition, FIG. 1 illustrates one operational environment where the above-described functionality could be used. This functionality could be used in any suitable device or system.

Figure 2:
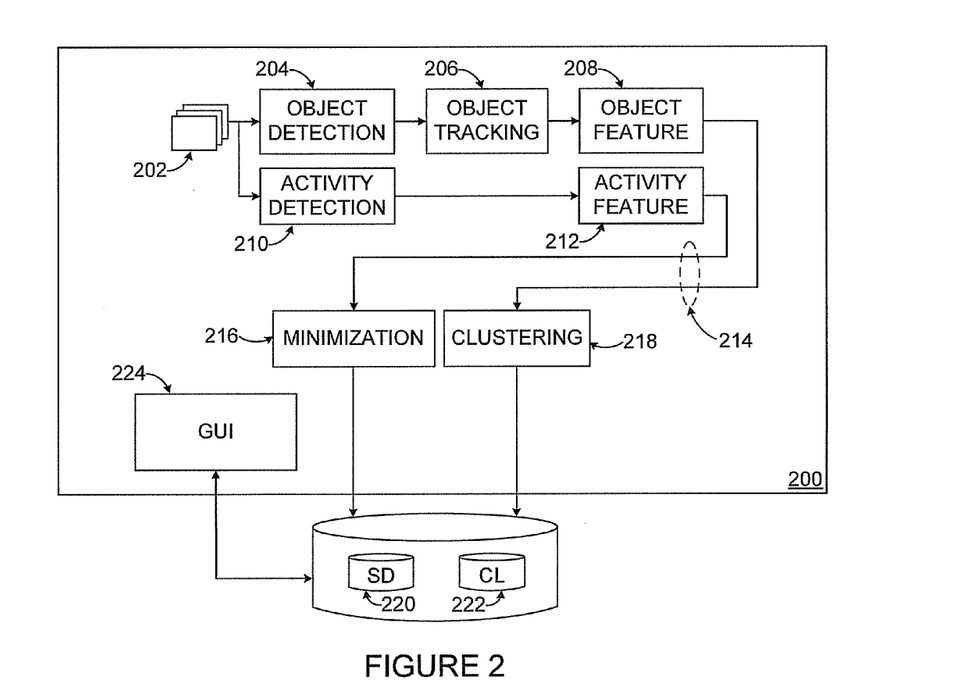
FIG. 2 illustrates an example apparatus for efficient indexing and querying of images according to this disclosure.

FIG. 2 illustrates an example apparatus 200 for efficient indexing and querying of images according to this disclosure. In particular, FIG. 2 illustrates one example embodiment of an apparatus 200 implementing the identification/matching system 104 of FIG. 1. The embodiment of the apparatus 200 shown in FIG. 2 is for illustration only. Other embodiments of the apparatus 200 could be used without departing from the scope of this disclosure.

As shown in FIG. 2, the apparatus 200 receives images 202, such as images captured by the cameras 102a-102n in FIG. 1. Each of the images 202 could represent any suitable image, such as a still image or an image frame from a video sequence. Each of the images 202 could also have any suitable resolution and format (such as color or black and white). The images 202 could be received in any suitable manner, such as over a wired or wireless connection.

The images 202 are provided to an object detection unit 204. The object detection unit 204 performs object detection to identify objects in the images 202. For example, the object detection unit 204 could detect faces of people contained in the images 202. Any suitable technique could be used by the object detection unit 204 to detect objects in images. The object detection unit 204 includes any hardware, software, firmware, or combination thereof for identifying objects within images.

Information associated with detected objects is provided to an object tracking unit 206. The object tracking unit 206 performs tracking to identify any movement of the detected objects. For example, the object tracking unit 206 could track a person across multiple images 202 (from the same camera or different cameras). Any suitable technique could be used by the object tracking unit 206 to track objects in images. The object tracking unit 206 includes any hardware, software, firmware, or combination thereof for tracking objects within images.

Information associated with the detected objects and any movement of those objects is provided to an object feature unit 208. The object feature unit 208 extracts or identifies various features of the detected objects. For example, the object feature unit 208 could generate a feature vector for each identified face, where the feature vector contains values associated with different features of that particular face. The identified features could represent any suitable features associated with an object, such as Fourier features or wavelet features. Any suitable technique could be used by the object feature unit 208 to identify features of objects. In some embodiments, the identification of features could be based on a priori knowledge of a particular area or areas where the images 202 are captured, such as a three-dimensional model of an area. The object feature unit 208 includes any hardware, software, firmware, or combination thereof for identifying features of one or more objects.

In this example, the received images 202 are also provided to an activity detection unit 210. The activity detection unit 210 identifies different events or other activities occurring within the captured images. For example, the activity detection unit 210 could identify dynamic texture features in the images 202. As particular examples, the activity detection unit 210 could identify a vehicle moving within an image or a person loitering in a particular area. Any suitable technique could be used by the activity detection unit 210 to detect activities in images. The activity detection unit 210 includes any hardware, software, firmware, or combination thereof for identifying activities within images.

Information associated with the detected activities is provided to an activity feature unit 212. The activity feature unit 212 extracts or identifies various features of the activities identified by the activity detection unit 210. For example, the activity feature unit 212 could be dynamic texture features, which exhibit certain stationary properties in space and time. Any suitable technique could be used by the activity detection unit 210 to identify features of activities. In some embodiments, the identification of features could be based on a priori knowledge of a particular area or areas where the images 202 are captured, such as prior knowledge of the scene or activity context. The activity feature unit 212 includes any hardware, software, firmware, or combination thereof for identifying features of activities.

The features from the object feature unit 208 and the activity feature unit 212 are collectively identified as features 214 and are provided to a minimization unit 216 and a clustering unit 218. The minimization unit 216 generates the sparse data representations of the features, while the clustering unit 218 groups similar images or images of similar objects into clusters. The minimization unit 216 includes any hardware, software, firmware, or combination thereof for generating sparse data representations, and the clustering unit 218 includes any hardware, software, firmware, or combination thereof for grouping images.

The minimization unit 216 can generate the sparse data representations of features in any suitable manner. For example, in some embodiments, the minimization unit 216 generates the sparse data representations by performing an $L^1$-norm minimization. For a general pattern recognition problem (such as face recognition), there is typically a training phase and a test phase. The training phase typically involves the use of training data for multiple classes. The number of classes is denoted k, and the total set of training data is denoted n. Each sample in the training data could be a w×h gray image. A vector v can be defined as $v \in R^m$ (where m=wh) by stacking the image's columns. A given set of training samples $n_i$ can be arranged from the $i^{th}$ class as columns of a matrix $A_i=[v_{i,1}, v_{i,2}, \ldots, v_{i,n_i}] \in R^{m \times n_i}$. The entire training set can be viewed as the concatenation of the n training samples of all k classes, which can be expressed as:

$$A=[A_1, A_2, \ldots, A_k]=[v_{1,1}, v_{1,2}, \ldots, v_{k,n_k}]. \quad (1)$$

During the test phase, for a new test sample $y \in R^m$, the class to which it belongs is identified. If the test data $y \in R^m$ belongs to the $i^{th}$ class, $y \in R^m$ can be assumed to lie in the linear span of the training samples of the $i^{th}$ class. This could be expressed as:

$$y=\alpha_{i,1} v_{i,1} + \alpha_{i,2} v_{i,2} + \ldots + \alpha_{i,n_i} v_{i,n_i}. \quad (2)$$

The linear representation of y can be re-written in the whole training data as follows:

$$y = Ax_o \quad (3)$$

where $x_0 = [0, \ldots, 0, \alpha_{i,1}, \alpha_{i,2}, \ldots, \alpha_{i,n_i}, 0, \ldots, 0]^T$ is a coefficient vector whose entries are zero except for those associated with the $i^{th}$ class. One possible solution to this problem is the $L^0$-norm minimization, which can be expressed as follows:

$$\hat{x}_o = \arg\min \|x\|_0 \text{ subject to } Ax = y. \quad (4)$$

Here, $\|\cdot\|_0$ denotes the $L^0$-norm, which counts the number of non-zero entries in a vector.

If the $L^1$-norm minimization is set equal to the $L^0$-norm minimization, the $L^1$-norm minimization is a convex optimization problem. The $L^1$-norm minimization can be solved using a linear programming method, which can be expressed as follows:

$$\hat{x}_1 = \arg\min \|x\|_1 \text{ subject to } Ax = y. \quad (5)$$

Equation (5) can be used by the minimization unit 216 to calculate $\hat{x}_1$, which is the sparse data representation of a test image. The minimization unit 216 can then check whether $\hat{x}_1$ is sparse enough, meaning only the associated $i^{th}$ class coefficients are non-zero. Normally, the minimization unit 216 could use some sparsity threshold value to verify the calculated value of $\hat{x}_1$. For example, a valid test image could have a sparse representation whose non-zero entries concentrate mostly on one subject, whereas an invalid test image could have sparse coefficients spread widely among multiple subjects.

The resulting sparse data representations of features produced by the minimization unit 216 span a high-dimensional polytope, where each vertex of the polytope is a training image's feature. An example of this polytope is shown in FIG. 3. Additional details regarding the generation of sparse data representations and high-dimensional polytopes are found in John Wright et al., "Robust Face Recognition via Sparse Representation," accepted for publication by IEEE Trans. PAMI, March 2008. That document is hereby incorporated by reference.

The clustering unit 218 can group images into clusters in any suitable manner. For example, in some embodiments, the clustering unit 218 uses agglomerative clustering to group images into clusters. As a particular example, during agglomerative clustering, unlabeled data can be analyzed. The goal of agglomerative clustering is to group n images into c clusters. Note that the number of clusters c may (but need not) equal the number of classes k in the training data. Each image could be initially placed into its own group, forming n initial clusters each with a single image. During an iterative process, at each step of the iteration, the closest pair of clusters are merged using average linkage, meaning the average of the pairwise distances. This procedure continues until a specified number of clusters c is obtained. An example of the clustering results is shown in FIG. 4.

Data associated with the sparse data representations and the clustering is respectively stored as a sparse data (SD) index 220 and a clustering (CL) index 222, such as in the database 106. The sparse data index 220 may form the polytope discussed above and shown in FIG. 3, and the clustering index 222 may define the clusters as shown in FIG. 4.

At this point, the sparse data representations and the clusters can be used in any suitable manner. For example, an operator can submit a query image or sequence of query images (such as temporarily ordered query images) to the identification/matching system 104, which identifies images related to an object or activity in the query image(s). As a particular example, one or more of the cameras 102a-102n could capture one or more images of an object or activity. An operator could then submit the image(s) as a query through a graphical user interface (GUI) 224. The graphical user interface 224 could receive the image(s) and access the sparse data index 220. Features of the query image(s) (such as features determined using the units 204-212) can be used to access the sparse data index 220 and identify a point in the polytope. The sparse data representations around that point represent an initial set of images. The clustering index 222 can then be accessed to identify the cluster(s) to which the initial set of images belong(s). The graphical user interface 224 could then present to the operator all of the images from the identified cluster(s). Note that if temporarily ordered query images are submitted, these query images could represent a video sequence, a sequence of key frames extracted from a video sequence, or any other suitable collection of query images.

The graphical user interface 224 could support any other or additional functions. For example, the graphical user interface 224 could support the training of the identification/matching system 104, such as by providing training images so that the sparse data representations and clusters can be generated. The graphical user interface 224 includes any suitable interface for interacting with the identification/matching system 104.

Although FIG. 2 illustrates one example of an apparatus 200 for efficient indexing and querying of images, various changes may be made to FIG. 2. For example, the functional units shown in FIG. 2 are for illustration only. The apparatus 200 could include any number of functional units, and the functional units shown in FIG. 2 could be combined, omitted, or further subdivided according to particular needs. As particular examples, the unit 204 could be used for motion detection or could be a fusion of motion detection and object detection, units 210-212 could be omitted if activity detection is not required, or units 204-208 could be omitted if object detection is not required.

FIG. 3 illustrates an example sparse data representation index 300 according to this disclosure. FIG. 4 illustrates an example clustering index 400 according to this disclosure. The sparse data representation index 300 and the clustering index 400 shown in FIGS. 3 and 4 are for illustration only. Other embodiments of the sparse data representation index 300 and the clustering index 400 could be used without departing from the scope of this disclosure.

As shown in FIG. 3, the sparse data representation index 300 forms a high-dimensional polytope having multiple vertices 302. The vertices 302 generally represent the minimal descriptions of features for all of the training images provided during the training phase. Each vertex 302 of the polytope may represent a single feature (such as an object feature or a dynamic texture feature) of at least one of the training images.

As shown in FIG. 4, the clustering index 400 generally defines one or more clusters and the features associated with each cluster. In this example, the clustering index 400 represents a table. Each row of the table is associated with a different cluster and identifies one or more object or activity features associated with that cluster. It may be noted that any other suitable data structure, such as linked lists, could be used to store the information in the clustering index 400. The clusters defined by the clustering index 400 in FIG. 4 are shown in FIG. 3, where the circles representing the vertices 302 have different line patterns denoting the different clusters.

To query the sparse data representation index 300, one or more features of a query image can be extracted (such as by using the units 204-212 shown in FIG. 2). Those features can be used to identify a location in the polytope that is the sparse data representation index 300. The specific location depends on the extracted features of the query image. For example, in FIG. 3, a first query image is associated with a first query location, which occurs within the hexagon formed by features A5, A6, A9, A10, A13, and A14. This means that the first query image has features that are a combination of the object or activity features A5, A6, A9, A10, A13, and A14. As a result, images associated with those six vertices 302 can be returned to an operator. However, in addition to those images, the cluster(s) in which those features reside(s) can be identified, and any other images in those cluster(s) could also be provided to the operator. In this example, all six features A5, A6, A9, A10, A13, and A14 belong to the same cluster ("Cluster 3") as shown in FIG. 4. As a result, images associated with the features A17, A18, and A22 could also be provided to the operator.

Similarly, a second query image is associated with a second query location, which occurs within the hexagon formed by features A16, A17, A20, A21, A23, and A24. This means that the second query image has features that are a combination of the object or activity features A16, A17, A20, A21, A23, and A24. As a result, images associated with those six vertices 302 can be returned to an operator. In addition to those images, the cluster(s) for those features can be identified, and any other images in those cluster(s) could also be provided to the operator. In this example, the six features A16, A17, A20, A21, A23, and A24 are associated with three different clusters ("Cluster 3," "Cluster 4," and "Cluster 5") as shown in FIG. 4. As a result, all other images associated with the features from these three clusters could be provided to the operator. In this way, the operator can receive not only the images associated with the immediately surrounding vertices 302, but the images associated with those vertices' cluster(s) as well.

Although FIG. 3 illustrates one example of a sparse data representation index 300, various changes may be made to FIG. 3. For example, the sparse data representation index 300 could include any number of sparse data representations. Also, a query location could be surrounded by any suitable number of sparse data representations and need not reside in spaces formed by six vertices. As a particular example, a query location could reside in an area defined by three nearby vertices or in any other area defined by a geometric pattern of the vertices. Although FIG. 4 illustrates one example of a clustering index 400, various changes may be made to FIG. 4. For example, the clustering index 400 could define any number of clusters, and each cluster could include any number of features.

Figure 5:
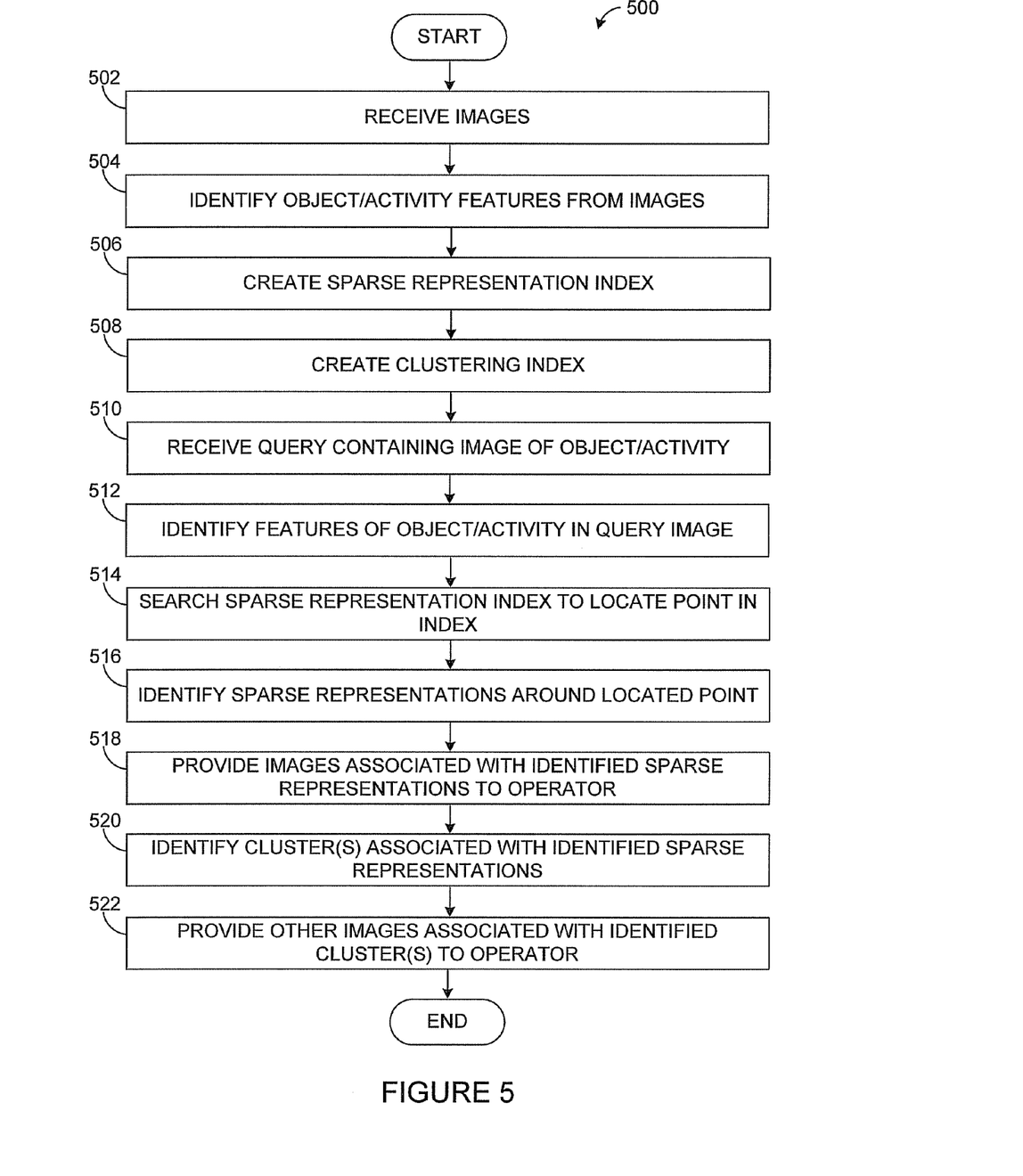
FIG. 5 illustrates an example method for efficient indexing and querying of images according to this disclosure.

FIG. 5 illustrates an example method 500 for efficient indexing and querying of images according to this disclosure. The embodiment of the method 500 shown in FIG. 5 is for illustration only. Other embodiments of the method 500 could be used without departing from the scope of this disclosure.

Images are received at step 502. This could include, for example, the identification/matching system 104 receiving a set of training images. The images could be received from any suitable source, such as from one or more cameras 102a-102n, through a terminal 114, or over a wired or wireless network. The received images could capture any suitable objects or activities.

Features of objects or activities in the images are identified at step 504. This could include, for example, units 204-208 in the identification/matching system 104 identifying and tracking objects and extracting features of those objects. This could also include units 210-212 in the identification/matching system 104 identifying activities and extracting features of those activities.

A sparse representation index is created at step 506. This could include, for example, the minimization unit 216 in the identification/matching system 104 performing an $L^1$-norm minimization using the identified features of the objects or activities. The features here can be organized into different classes, and the training images can have features from any suitable number of classes. The training images therefore could be used to form an over-complete dictionary whose base elements are the training images' features. The $L^1$-norm minimization is used to calculate a sparse (and possibly the sparsest) linear representation of the training data in terms of this dictionary. This step could produce a sparse representation index having the form of a multi-dimensional polytope.

A clustering index is created at step 508. This could include, for example, the clustering unit 218 in the identification/matching system 104 grouping the training images into multiple clusters using agglomerative clustering. As a particular example, the clustering unit 218 could first place each training image in its own cluster. The clustering unit 218 could then identify the closest pair of clusters using average linkage and merge those clusters. This could occur iteratively until a desired number of clusters is obtained.

A query containing an image of an object or activity is received at step 510. This could include, for example, an operator providing the identification/matching system 104 with an image from a camera. As particular examples, the image could represent an image of a suspicious person or an image of a suspicious activity. Features of the object or activity in the query image are identified at step 512. This could include, for example, the units 204-212 in the identification/matching system 104 identifying features of the object or activity in the query image.

The sparse representation index is searched using the query image's features to identify a point in the index at step 514, and the sparse representations around that point are identified at step 516. This could include, for example, the identification/matching system 104 accessing the polytope representing the sparse representation index 300 and using the features of the query image to identify a location in the polytope. The location in the polytope is surrounded by multiple vertices 302, such as six vertices as shown in FIG. 3. These vertices represent features of the training images, and the features of the query image generally represent a combination of the features from those vertices. Images associated with the identified sparse representations around the point in the sparse representation index are provided to an operator at step 518. This could include, for example, the identification/matching system 104 providing the images to an operator via a terminal 114.

One or more clusters associated with the identified sparse representations around the point in the sparse representation index are identified at step 520. This could include, for example, the identification/matching system 104 identifying the cluster for each vertex 302 of the polytope around the identified point in the polytope. As a particular example, the six vertices 302 around the identified point in the polytope could all belong to the same cluster, or at least some of the vertices could belong to different clusters. The identification of the clusters could occur using a clustering index, such as that shown in FIG. 4. Other images associated with the identified cluster(s) are provided to the operator at step 522. This could include, for example, the identification/matching system 104 identifying the images in the cluster(s) that have not already been presented to the operator and providing those images to the operator via the terminal 114.

Although FIG. 5 illustrates one example of a method 500 for efficient indexing and querying of images, various changes may be made to FIG. 5. For example, the steps in FIG. 5 could be performed by the same device or system or by different devices or systems. As a particular example, a first device or system could perform steps 502-508 to generate the indexes, and a second device or system could perform steps 510-522 to use the indexes. The generated indexes could be provided to the second device or system in any suitable manner, such as by downloading the indexes over a wired or wireless network. Also, other or additional steps could occur in the method 500. For instance, in some embodiments, steps 520-522 could be performed only in response to determining that the operator has requested more images (in addition to the images presented at step 518). In addition, while shown as a series of steps, various steps in FIG. 5 could overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving one or more query images;
identifying multiple features associated with an object or an activity using the one or more query images;
accessing a sparse representation index using the identified features, the sparse representation index comprising a multi-dimensional polytope having multiple vertices, the features identifying a point in the polytope;
identifying multiple vertices in the sparse representation index that are associated with the identified point;
providing one or more images associated with the identified vertices;
identifying one or more clusters of features associated with the identified vertices; and
providing one or more additional images associated with the one or more identified clusters.

2. The method of claim 1, wherein:
the vertices of the multi-dimensional polytope are associated with features of training images; and
the identified features represent a combination of the features associated with the identified vertices.

3. The method of claim 1, wherein:
the vertices of the polytope define multiple areas; and
identifying the multiple vertices in the sparse representation index comprises identifying the vertices defining the area in which the point resides.

4. The method of claim 1, wherein identifying the one or more clusters comprises using a clustering index identifying the clusters and features of training images associated with the clusters.

5. The method of claim 1, wherein:
providing the one or more images comprises presenting the one or more images to an operator; and
providing the one or more additional images comprises providing the one or more additional images in response to a request for more images from the operator.

6. The method of claim 1, further comprising:
generating the sparse representation index; and
generating a clustering index associated with multiple clusters of features.

7. The method of claim 6, wherein generating the sparse representation index comprises:
identifying multiple features associated with multiple objects or multiple activities using training samples; and
performing an $L^1$-norm minimization of $y = Ax_o$, where $x_0 = [0, \ldots, 0, \alpha_{i,1}, \alpha_{i,2}, \ldots, \alpha_{i,n_i}, 0, \ldots, 0]^T$ and denotes a coefficient vector, $\alpha_{i,1}$ through $\alpha_{i,n}$ denote non-zero entries in the coefficient vector associated with an $i^{th}$ class of training samples, and A represents a concatenation of all training samples from all classes.

8. The method of claim 6, wherein generating the clustering index comprises:
forming an initial set of clusters, each containing at least one image; and
iteratively merging two closest clusters defined using average linkage until a specified number of clusters is obtained.

9. The method of claim 1, wherein receiving the one or more query images comprises receiving a sequence of temporally ordered query images.

10. An apparatus comprising:
at least one memory configured to store images; and
at least one processor configured to:
identify multiple features associated with multiple objects or multiple activities using the images;
generate sparse data representations of the identified features; and
generate a sparse representation index using the sparse data representations, the sparse representation index comprising a multi-dimensional polytope having multiple vertices, the vertices associated with the sparse data representations.

11. The apparatus of claim 10, wherein the at least one processor is configured to generate the sparse data representations by performing an $L^1$-norm minimization of $y=Ax_o$, where $x_0=[0, \ldots, 0, \alpha_{i,1}, \alpha_{i,2}, \ldots, \alpha_{i,n_i}, 0, \ldots, 0]^T$ and denotes a coefficient vector, $\alpha_{i,1}$ through $\alpha_{i,n}$ denote non-zero entries in the coefficient vector associated with an $i^{th}$ class of training samples in the images, and A represents a concatenation of all training samples from all classes.

12. The apparatus of claim 10, wherein the at least one processor is further configured to group the images into multiple clusters.

13. The apparatus of claim 12, wherein the at least one processor is configured to group the images into multiple clusters by:
forming an initial set of clusters, each containing at least one image; and
iteratively merging two closest clusters defined using average linkage until a specified number of clusters is obtained.

14. The apparatus of claim 12, wherein the at least one processor is further configured to:
receive one or more query images;
identify multiple features associated with an object or an activity using the one or more query images;
access the sparse representation index using the identified features;
identify multiple vertices in the sparse representation index that are associated with the identified point; and
provide one or more images associated with the identified vertices.

15. The apparatus of claim 14, wherein the at least one processor is further configured to:
identify one or more of the clusters associated with the identified vertices; and
provide one or more additional images associated with the one or more clusters.

16. A non-transitory tangible computer readable storage medium embodying a computer program, the computer program comprising:
computer readable program code for identifying multiple features associated with an activity using one or more query images;
computer readable program code for accessing a sparse representation index using the identified features, the sparse representation index comprising a multi-dimensional polytope having multiple vertices, the features identifying a point in the polytope;
computer readable program code for identifying multiple vertices in the sparse representation index that are associated with the identified point; and
computer readable program code for providing one or more images associated with the identified vertices.

17. The computer readable storage medium of claim 16, wherein the computer program further comprises:
computer readable program code for identifying one or more clusters of images associated with the identified vertices; and
computer readable program code for providing one or more additional images associated with the one or more identified clusters.

18. The computer readable storage medium of claim 17, wherein the computer program further comprises:
computer readable program code for generating the sparse representation index; and
computer readable program code for generating a clustering index associated with multiple clusters of features.

19. The computer readable storage medium of claim 18, wherein the computer readable program code for generating the sparse representation index comprises:
computer readable program code for identifying multiple features associated with multiple objects or multiple activities using training samples; and
computer readable program code for performing an $L^1$-norm minimization of $y=Ax_o$, where $x_0=[0, \ldots, 0, \alpha_{i,1}, \alpha_{i,2}, \ldots, \alpha_{i,n_i}, 0, \ldots, 0]^T$ and denotes a coefficient vector, $\alpha_{i,1}$ through $\alpha_{i,n}$ denote non-zero entries in the coefficient vector associated with an $i^{th}$ class of training samples, and A represents a concatenation of all training samples from all classes.

20. The computer readable storage medium of claim 18, wherein the computer readable program code for generating the clustering index comprises:
computer readable program code for forming an initial set of clusters, each containing at least one image; and
computer readable program code for iteratively merging two closest clusters defined using average linkage until a specified number of clusters is obtained.

* * * * *